No. 796,944. PATENTED AUG. 8, 1905.
H. S. STEWART & M. A. WILCOX.
HEATER.
APPLICATION FILED DEC. 19, 1903.
6 SHEETS—SHEET 1.
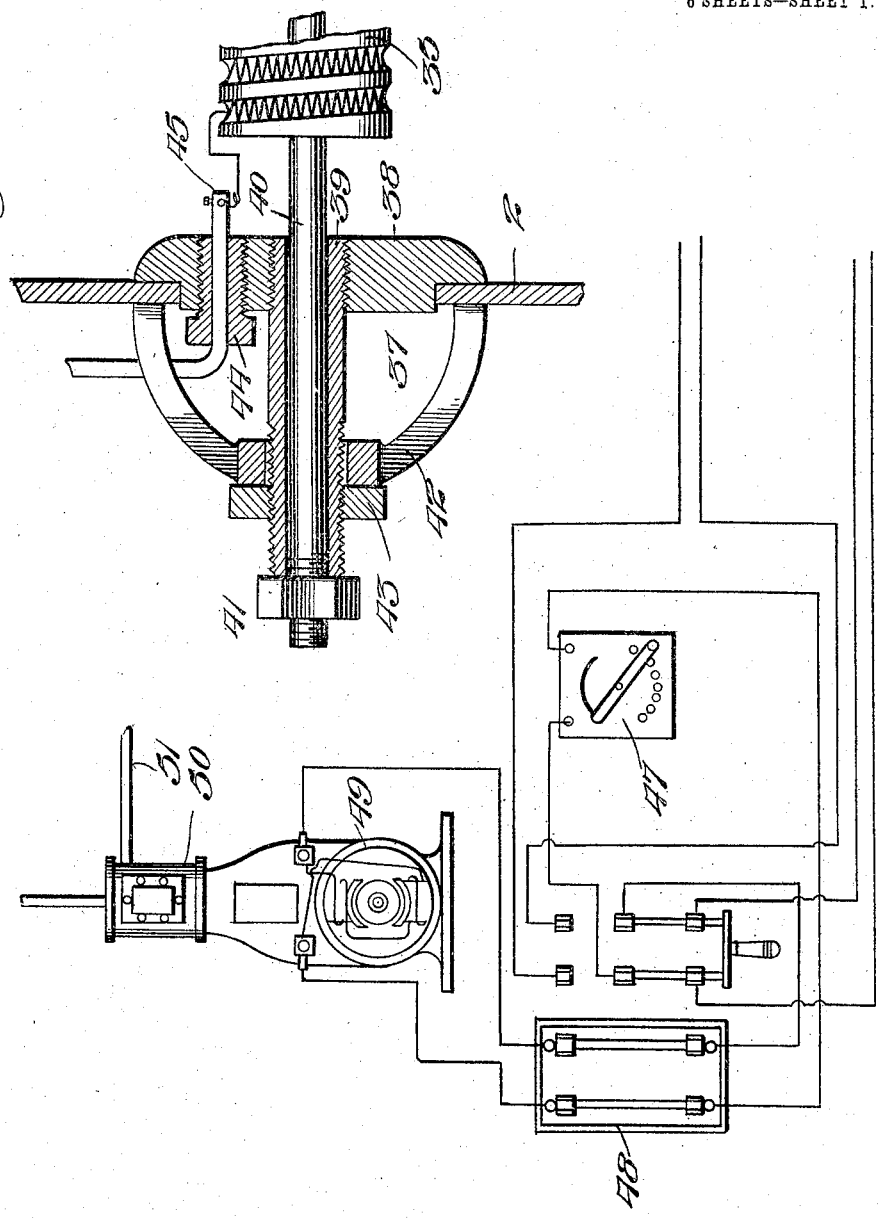
Witnesses
Phil. E. Barnus.
C. C. Hines.
Inventors
Margaret A. Wilcox
Harry S. Stewart
By Victor J. Evans
Attorney

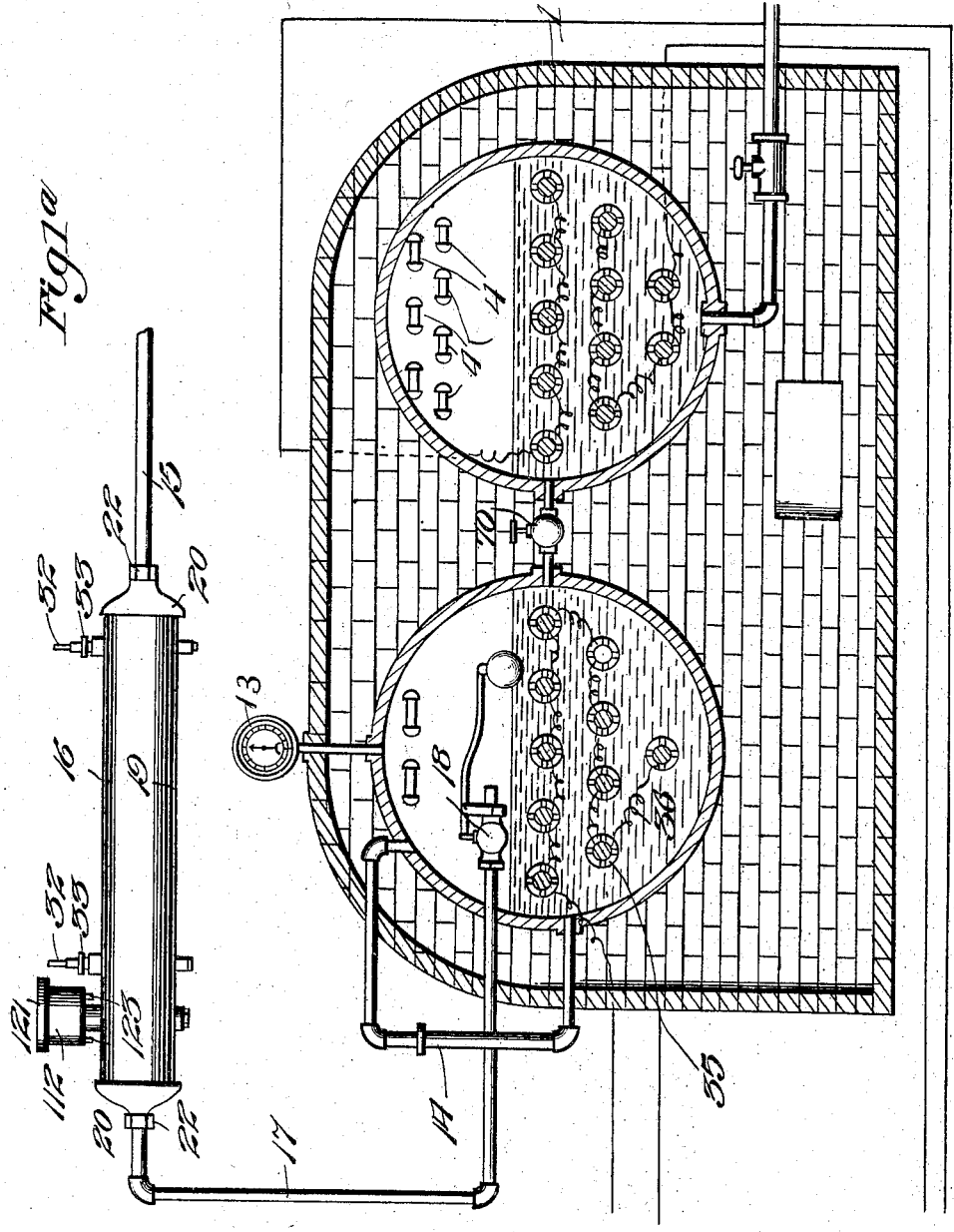

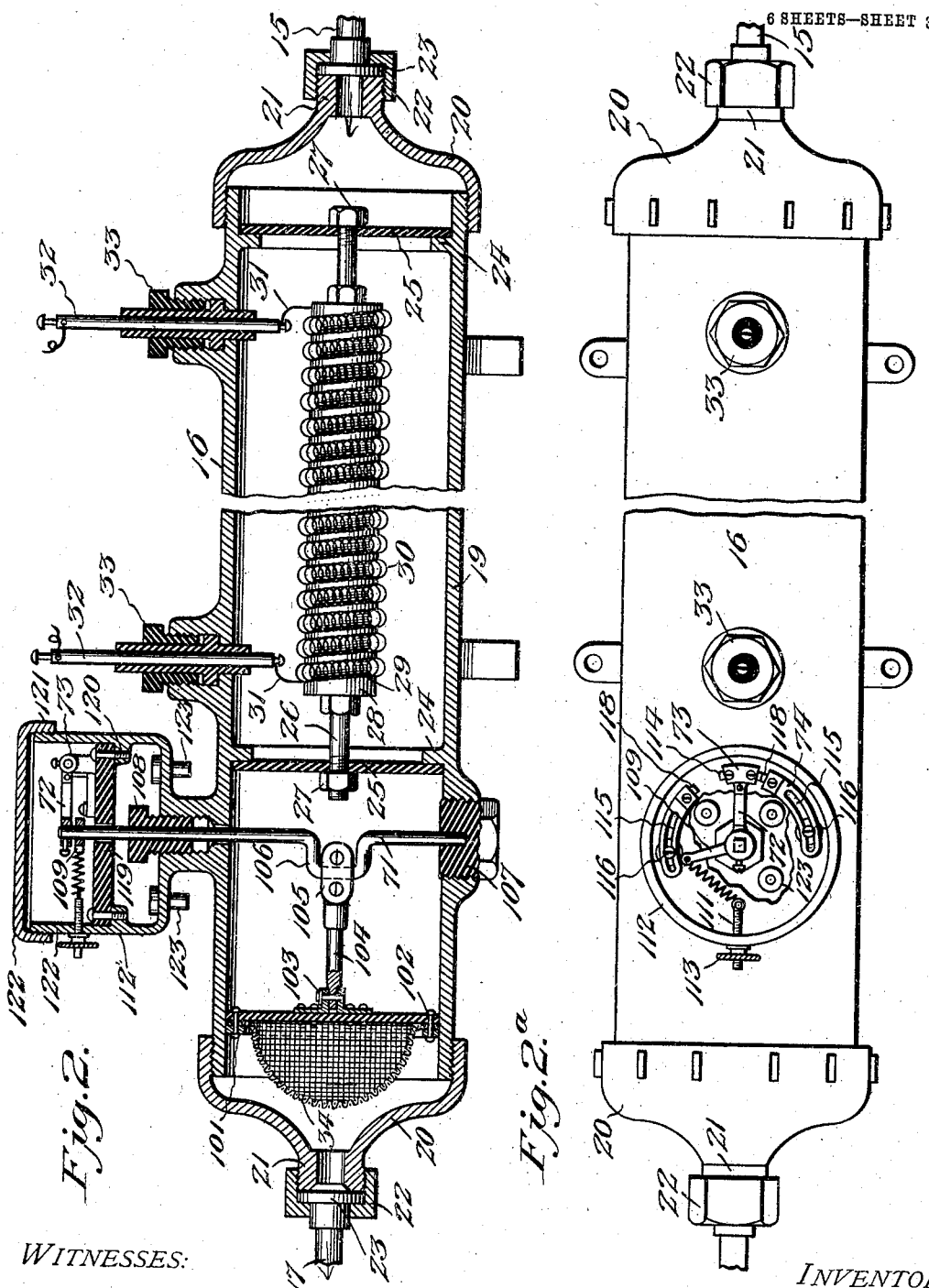

No. 796,944. PATENTED AUG. 8, 1905.
H. S. STEWART & M. A. WILCOX.
HEATER.
APPLICATION FILED DEC. 19, 1903.
6 SHEETS—SHEET 4.
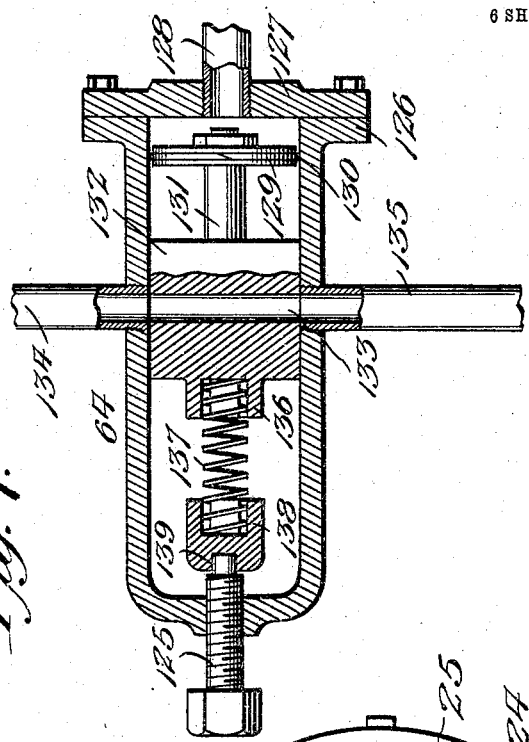
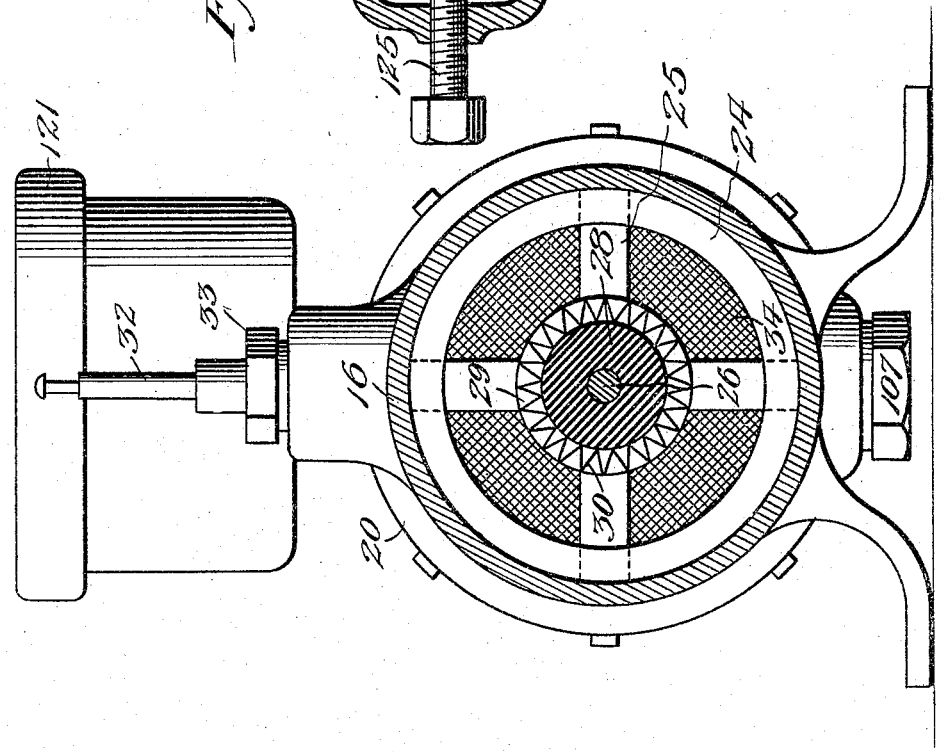
WITNESSES:
Edwin F. McKee
Geo. Ackman Jr.
INVENTORS
Margaret A. Wilcox
Harry S. Stewart
BY
Victor J. Evans
Attorney

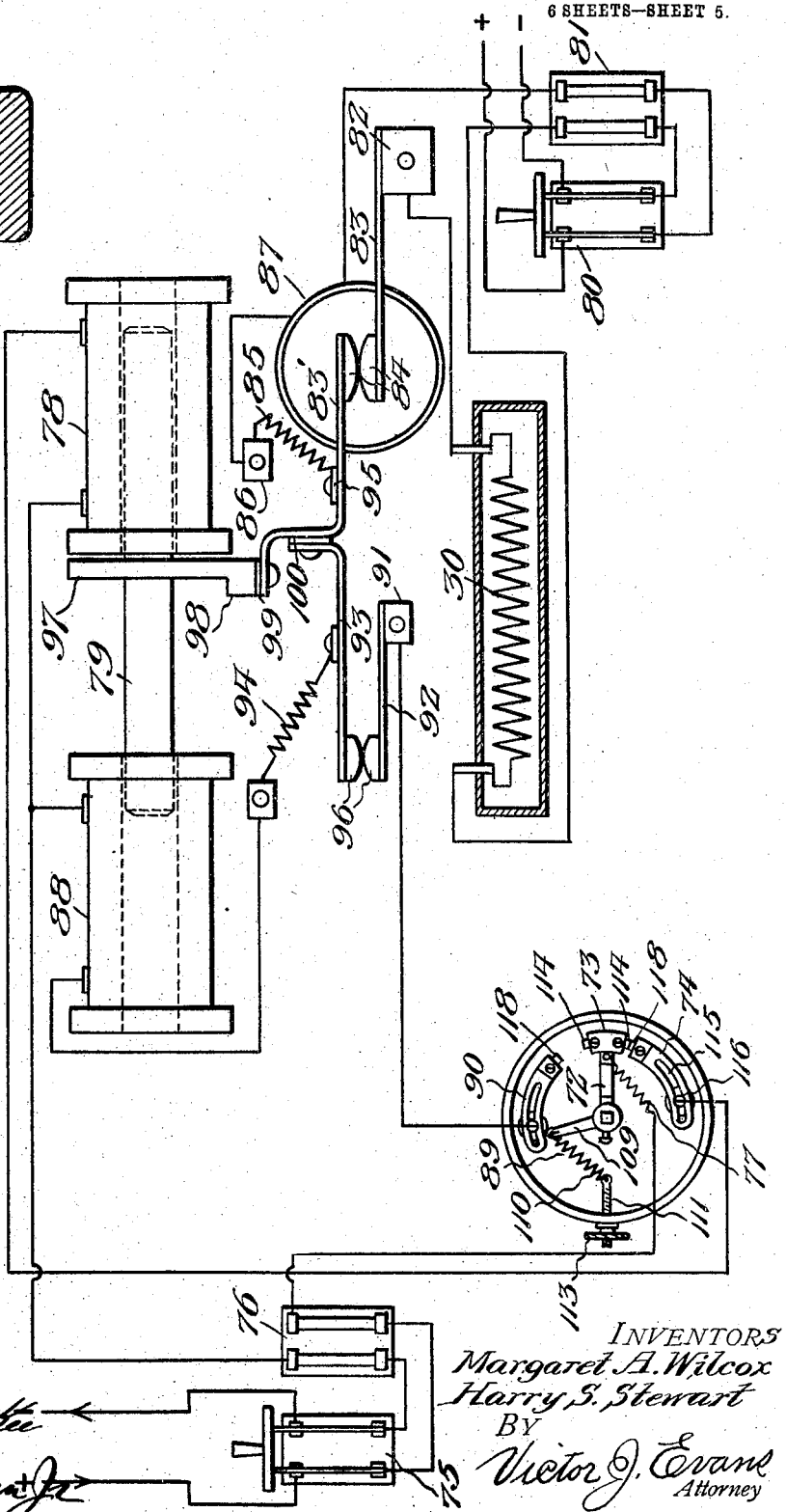

No. 796,944. PATENTED AUG. 8, 1905.
H. S. STEWART & M. A. WILCOX.
HEATER.
APPLICATION FILED DEC. 19, 1903.
6 SHEETS—SHEET 6.
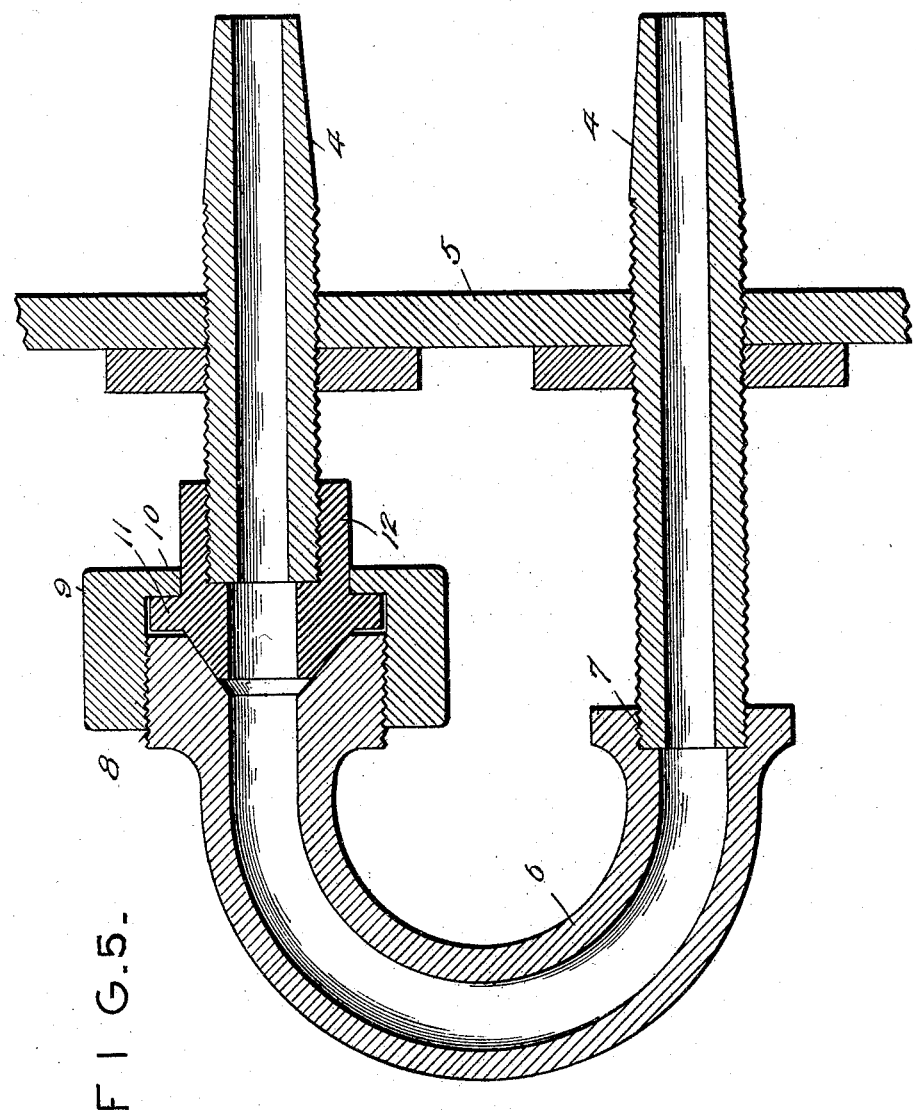
Witnesses
Harry L. Amer.
Geo Ackman Jr
Inventors
Margaret A. Wilcox
Harry S. Stewart.
By Victor J. Evans
Attorney

UNITED STATES PATENT OFFICE.

HARRY S. STEWART AND MARGARET A. WILCOX, OF CHICAGO, ILLINOIS.

HEATER.

No. 796,944. Specification of Letters Patent. Patented Aug. 8, 1905.

Application filed December 19, 1903. Serial No. 185,852.

*To all whom it may concern:*

Be it known that we, HARRY S. STEWART and MARGARET A. WILCOX, citizens of the United States, residing at Chicago, in the county of Cook and State of Illinois, have invented new and useful Improvements in Heaters, of which the following is a specification.

This invention relates to electrical boiler and feed-water heaters; and it consists in the novel construction, combination, and arrangement of parts, as hereinafter fully described, illustrated, and claimed.

In the accompanying drawings, Figures 1 and 1ª represent a view of the entire heater, showing the boiler in section and the remainder of the apparatus in elevation. Fig. 2 is a longitudinal section through the combined strainer or filter and initial heater. Fig. 2ª is a plan view of the same. Fig. 2ᵇ is a vertical cross-section through the combined filter and initial heater. Fig. 3 is a diagrammatic view showing the armature and electric connections for automatically controlling the initial heater. Fig. 4 is a detail section of one of the insulating pipe-couplings. Fig. 5 is an enlarged detail section showing the connection between the hot-water coils which lie in the steam-space of the boiler. Fig. 6 is an enlarged detail section showing the manner of mounting and removing the electric-heating coils. Fig. 7 is a longitudinal section through the automatically-controlled oil-supply valve.

Like reference-numerals designate corresponding parts in all the figures of the drawings.

Referring to the drawings, 1 designates a furnace in which are arranged steam-boilers 2 and 3 These boilers are preferably of the horizontal type and are pierced by hot-water pipes 4, which extend horizontally and lengthwise of the boilers and are located wholly within the steam-space or above the water-level, as indicated in Fig. 1ª. The ends of the pipes 4 extend through the boiler-heads 5, where the pipes are connected in pairs by means of elbows 6, substantially U-shaped or semicircular, as shown in the detail view, Fig. 5. At one end each elbow 6 is internally threaded, as shown at 7, to receive the end of one of the hot-water pipes, while the opposite end is enlarged or provided with an exteriorly-threaded head 8, which receives an internally-threaded coupling or union 9, provided with a flange 10 to engage a corresponding flange 11, projecting circumferentially from a head 12, which is internally screw-threaded to receive the adjacent hot-water pipe, all as clearly shown in Fig. 5. 13 designates a steam-gage connected with the boiler 2, and 14 represents a water-gage, both of said gages being of the usual construction.

The water-supply in its passage to the boiler 2 through the supply-pipe 15 enters and passes through the combined initial heater and filter or strainer 16, and after passing through said strainer the water is carried, by means of the pipe 17, into the boiler 2, where its admission is controlled by means of a float-operated valve 18, the latter serving to maintain the water at a certain level at all times within the boiler, as shown in Fig. 1ª. The combined filter or strainer and initial heater 16 is best illustrated in Fig. 2, wherein it is seen to comprise an outer cylindrical casing or shell 19, provided at opposite ends with internally-threaded heads 20, each of which is provided with an exteriorly-threaded central hollow boss 21, upon which is screwed a coupling 22, which is flanged to engage the head 23 on the adjacent extremity of the water-supply pipe 15 or connecting-pipe 17, which leads to the boiler, as the case may be. At or near opposite ends the casing 19 is provided with internal annular flanges 24, against the outer surfaces of which are arranged cross-bars or spiders 25, the central portions of which are formed with openings to receive a supporting rod or bar 26, the ends of said rod passing through the cross-bars 25 and being threaded to receive securing-nuts 27. Mounted upon the rod 26 is a cylinder 28, of porcelain or other suitable non-conducting material, provided exteriorly with a spiral groove 29, while extending around and lying within the spiral groove 29 is an electric-heating coil 30, of German-silver wire, the opposite extremities 31 of said coil being connected to suitable binding-posts 32, which pass through the side of the casing 19 and are insulated therefrom by means of blocks or plugs 33, preferably screwed into openings formed in said outer casing and as clearly illustrated in Fig. 2. At one end a filter or strainer 34 is placed within one of the heads 20 and beyond the supporting cross-bars 25, so that as the water passes through the casing 19 it is heated and all foreign substances the precipitation of which is accelerated and insured by the heat are strained and removed from the water, thereby allowing the latter to pass in a comparatively pure condition to the boiler. The binding-posts 32 are placed in electrical connection with the dynamo hereinafter referred to.

Within the water-space of each of the boilers 2 and 3 are arranged series of electrical heating-coils 35, the heating-coils of each boiler being connected up in series, as indicated by the wiring 36 in Fig. 1ª. Each of said heating-coils is identical in construction with that shown in Fig. 2, and the current is fed thereto from the dynamo hereinafter referred to. It will also be seen that all of the coils 35 are located beneath the surface of the water, and by being thus submerged in the boiler-water the heating effect of said coils is greatly enhanced. In order to make the heating-coils 35 accessible, the boiler-head at one end of the boiler is provided with hand-holes 37, closed by means of flanged covers 38, as best illustrated in detail in Fig. 6. Connected centrally with the cover 38 is a sleeve 39, which extends outwardly and receives the supporting-rod 40 of the corresponding heating-coil 35, the extremity of the rod 40 being threaded to receive a retaining-nut 41. The cover 38 is held in place by means of a yoke or spider 42, which embraces the sleeve 39 and is held against the boiler-head by means of a nut 43, screwed upon an exteriorly-threaded portion of the sleeve 39, said nut serving to force the yoke or spider inward and draw the cover 38 outward, thereby tightly closing and hermetically sealing the hand-hole 37. The cover 38 is further provided with a threaded opening to receive a screw-plug 44, of non-conducting material, through which passes a binding-post 45, electrically connected with the dynamo. The wires from the heating-coils of the initial heater and also those located within the water-space of the boilers extend from said coils to a suitable switch 46, said wires leading in turn through a rheostat 47 to the fuse-board 48.

49 designates a dynamo or electric generator which is driven by means of an engine 50, to which leads a steam-supply pipe 51, leading from any suitable source of steam-supply. This generator may be driven by any other source of power, and any other source of current-supply may be used.

The apparatus hereinabove described is adapted for general heating and lighting purposes, for running fans and light machinery, and cooking, &c. The water heated in pipes 4 may be carried, by means of suitable piping, to any and all parts of a house or building for heating purposes. The dynamo 49 generates electricity and feeds the same to the heating-coils 30 and 35, the coil 30 acting to heat and purify the water as it is fed to the boiler and the coils 35 serving to heat the water in the boiler to generate steam.

The heating-coils are mounted on cylindrical carriers, which are straight and which may therefore be easily removed through the hand-holes in the heads of the boilers. The said heating-coils are also conveniently mounted by means of the supporting-rods, which facilitate the removal and repair of said coils whenever necessary. In the summer season the use of the boiler No. 3 may be dispensed with, as said boiler is arranged to be readily thrown into and out of operation by placing the same in or out of communication with the primary boiler No. 2, a cut-off valve 70 being located intermediate said boilers.

In order to automatically cut off and turn on the current which supplies the coils of the initial heater, the strainer 34 is made concavo-convex, as shown in Fig. 2, so that when the outlet-pipe 17 is opened the water rushes through the casing 19 and through the screen 34, pushing said screen ahead, which operates to turn the crank-shaft 71, to which is connected contact-arm 72, which carries contact-head 73, therefore making contact with contact-finger 74. The positive current passes from a controlled switch 75, through fuse 76, to helix 77, the contact-head 73, contact-finger 74, to magnet 78, thence back through fuse to control-switch. This energizes the magnet 78 and attracts the armature 79, therefore completing the circuit for the heated coil, said position being termed the "on position."

Starting from the positive of the heater-circuit the current flows through the main switch 80 and fuse 81 from the heater-coil to contact-terminal 82, through contact-fingers 83 and 83' and 84 to helix 85, to terminal 86, to blow-out coil 87, back through the main fuse and switch. This energizes the blow-out coil 87, which forms the magnetic field and blows out the arc, when the main contact-fingers 83 and contact-tips 84 are drawn apart by the magnet 88.

When the outlet-pipe 17 is closed, the tension-spring 89 turns the crank-shaft 71 in an opposite direction, drawing back the screen 34 and the contact-arm 72, thereby making contact between contact-head 73 and contact-finger 90. The positive current goes from the control-switch 75 and fuse 76 to the helix 77, flowing through contact-finger 90 to terminal 91, to auxiliary contact-fingers 92 and 93, through helix 94 to magnet 88, back through control-fuse 76 to control-switch. This energizes the magnet 88, which attracts the armature 79, thus drawing the main contact-fingers 83 and 83' and auxiliary contact-fingers 92 and 93 apart, this being termed the "off position," and opening both the circuit of the heater-coil at the main contact-tips 84 and the auxiliary contact-tips 96, making the heater-coil 30, magnet 78, magnet 88, and blow-out coil 87 dead. It will thus be seen that the water operates to automatically control the electrical connections so as to cut in and out the heater-circuits.

The armature 79 is made by preference of soft Swedish iron, which can be magnetized and demagnetized readily and is provided at the center with a round cast-iron head 97, provided with a radial lug 98, so that the main contact-finger 83' may be screwed, riveted, or otherwise firmly connected thereto, insulation 99 being interposed between the head and contact-finger. On the main contact-finger 83 is placed at right angles the auxiliary contact-finger 93, insulated therefrom, as shown at 100, the said fingers being rigidly connected to each other. On the main and auxiliary contact-fingers 83 and 83', 92 and 93 are fastened small pieces of copper (shown at 84 and 96) with arcuate or curved contact-faces.

The main contact-finger 83 is connected to the terminal 82 and is shaped identically the same as the auxiliary contact-finger 92. The helix 85 is composed of soft flexible copper wire with a number of coils to allow for the necessary movement of the main and auxiliary contact-fingers when adjusted to their on and off positions.

The screen 34 is quite fine and has its outer edge riveted between a binding-ring 101 and a spider-ring 102, thus making a very strong connection, the spider comprising a series of arms leading inward to the center, at which point is located a pair of lugs or ears 103, to which is pivotally connected one end of a connecting-rod 104, the opposite end being provided with a bearing 105 for the crank 106 of the crank-shaft 71. The lower extremity of the crank-shaft 71 has its bearing in a brass plug 107, screwed into a threaded opening in the casing 19, while the upper portion of the shaft 71 has its bearing in a similar screw-threaded plug 108, screwed into the upper side of the casing, all as shown in Fig. 2. At its upper end the shaft 71 is squared to enter a correspondingly-shaped opening in the arm 72 and also to enter a correspondingly-shaped opening in an auxiliary tension-arm 109, to which is connected a tension-spring 110, the tension of which is adjustable by means of a tension-screw 111, which passes through the side of the switch-box 112 and is engaged by a thumb-nut 113, by which the adjustment may be effected. The contact-head 73 is T-shaped and provided with an opening extending lengthwise of its outermost portion for the reception of carbon contact-tips 114. The contact-fingers 74 and 90 are of segmental shape and provided with slots 115 to receive clamping-screws 116, by which said fingers may be adjusted toward and away from each other to give the required and proper distance between them for the operation of the contact-head 73. Said fingers are also provided with carbon tips 118 for contacting with the tips 114.

Within the switch-box 112 is located a circular insulated base plate or support 119, provided with a central opening for the passage of the shaft 71 and also provided with openings for the passage of the wires leading to the contact-fingers. The base 119 is screwed or otherwise fastened to supporting-lugs 120, provided upon the inner side of the switch-box 112. 121 designates a cast-iron cap, which screws on top of the switch-box to exclude moisture. The inside of the switch-box and the cap are preferably lined with asbestos, as shown at 122, to prevent short-circuiting. Hard-rubber bushings 123 are inserted through the openings in the base of the switch-box to receive and admit of the passage of the wires which lead to the contact-fingers 74 and 90. All pipes coming to and from the initial heaters and the boilers are connected by insulated pipe-couplings 124, one of which is illustrated in detail in Fig. 4.

The several parts of the apparatus may be arranged in compact form by placing the dynamo, rheostat, switchboard, fuse-board, air compressor and tank, &c., behind the boilers or furnace. These and other changes may be made in the form, proportion, and minor details of construction without departing from the spirit or sacrificing any of the advantages of the invention.

Having thus described the invention, what is claimed as new, and desired to be secured by Letters Patent, is—

1. A heater for the purpose specified comprising adjacently-located boilers, electric-heating coils submerged in the water contained in the boiler when in operation, hot-water pipes located in the steam-spaces of the boilers, and a cut-off-controlled connection extending between the boilers, substantially as described.

2. A heater for the purpose specified comprising a boiler, electric-heating coils submerged in the water in the boiler, an electrical generator electrically connected to said coils, a filter or strainer connected with the water-supply pipe leading to the boiler, and a heating-coil located within said filter or strainer and electrically connected with said generator.

3. In an electrical boiler and feed-water heater, the combination of a boiler, a source of current-supply, an electrical heater in the boiler connected with said source of current-supply, a feed-water heater having an electrical heating device also connected with said source of current-supply, a feed-water-controlled element associated with said feed-water heater, a switch governing the flow of current from the source of supply to the heaters, and means governed by said feed-water-controlled element to open or close the switch, substantially as described.

4. A heater for the purpose specified comprising a boiler, electric-heating coils submerged in the water in the boiler, the boiler-head being provided with hand-holes in line with the heating-coils, covers for said holes, supporting-rods for the heating-coils passing through the hand-hole covers, and securing means for said covers.

5. A heater for the purpose specified comprising a boiler, electric-heating coils submerged in the water in the boiler when in operation, the boiler-head being provided with hand-holes in line with the heating-coils, covers for said holes, supporting-rods for the coils mounted in said covers, means for securing the covers in place and screw-plugs inserted through the covers and having binding-posts passing therethrough to which the terminals of the coils are connected in the manner and for the purpose set forth.

6. A heater for the purpose specified comprising a boiler, electric-heating coils submerged in the water in the boiler, the boiler-head being provided with hand-holes in line with the coils, covers for said holes, sleeves extending outward from said covers, supporting-rods for the coils passing through said sleeves, yokes or spiders for holding the covers in place, and retaining-nuts threaded upon the sleeves and engaging the spiders, substantially as and for the purpose described.

7. A heater for the purpose specified comprising a boiler, electric-heating coils submerged in the water in the boiler, an electrical generator communicating with said coils, a water-supply pipe leading to the boiler, and a filter or strainer associated with said water-supply pipe and comprising a casing, an electric-heating coil mounted therein and communicating with said generator, and a filtering or straining medium also mounted within the casing of the filter, substantially as described.

8. In a heater for the purpose specified, a filter comprising a cylindrical casing, heads at the opposite ends thereof to which the water-supply-pipe sections are connected, a supporting-rod extending centrally and longitudinally of the casing, an electric-heating coil mounted on said rod, and a straining or filtering medium located adjacent to the discharge end of the casing and beyond the heating-coil, substantially as described.

9. In a heater for the purpose specified, a boiler, heating-coils arranged in the water-space of the boiler and adapted to be submerged, and hot-water pipes extending in straight lengths through the steam-space of the boiler and through the opposite heads thereof, and U-shaped connections or elbows arranged exteriorly of the heads and connecting the hot-water pipes in pairs, substantially as described.

In testimony whereof we affix our signatures in presence of two witnesses.

HARRY S. STEWART.
MARGARET A. WILCOX.

Witnesses:
CLARA A. WILCOX,
Mrs. C. G. PAUL.